United States Patent [19]

Falk

[11] 4,170,006
[45] Oct. 2, 1979

[54] RADAR SPEED MEASUREMENT FROM RANGE DETERMINED BY FOCUS

[75] Inventor: Thomas Falk, Norwalk, Conn.

[73] Assignee: United Technologies Corporation, Hartford, Conn.

[21] Appl. No.: 175,890

[22] Filed: Aug. 30, 1971

[51] Int. Cl.² ............................................. G01S 9/46
[52] U.S. Cl. ............................... 343/5 CM; 343/9 R
[58] Field of Search ............... 343/5 R, 5 PC, 5 CM, 343/7 A, 8, 9, 17.7

[56] References Cited

U.S. PATENT DOCUMENTS

| 3,178,711 | 4/1965 | Case | 343/5 CM |
|---|---|---|---|
| 3,333,267 | 7/1967 | Williams | 343/5 CM |
| 3,603,992 | 9/1971 | Goggins | 343/5 CM |

Primary Examiner—Stephen C. Bentley
Attorney, Agent, or Firm—M. P. Williams

[57] ABSTRACT

In a forward-looking coherent pulse doppler synthetic aperture radar, focus adjusted only as a function of speed is applied in an identical fashion to each range channel, whereby data representative of a radar reflectivity map, stored as a matrix of range and doppler frequency, provides maximum contrast only for ranges corresponding to the focus applied to each range channel. Determination of maximum contrast determines the range to which the focus is related, which range may be utilized in a speed computation. In one embodiment, the range for which maximum contrast is calculated is utilized as the range for speed computation; in another embodiment, known curve fitting techniques are utilized so as to determine a maximum in a curve of contrast versus range.

2 Claims, 3 Drawing Figures

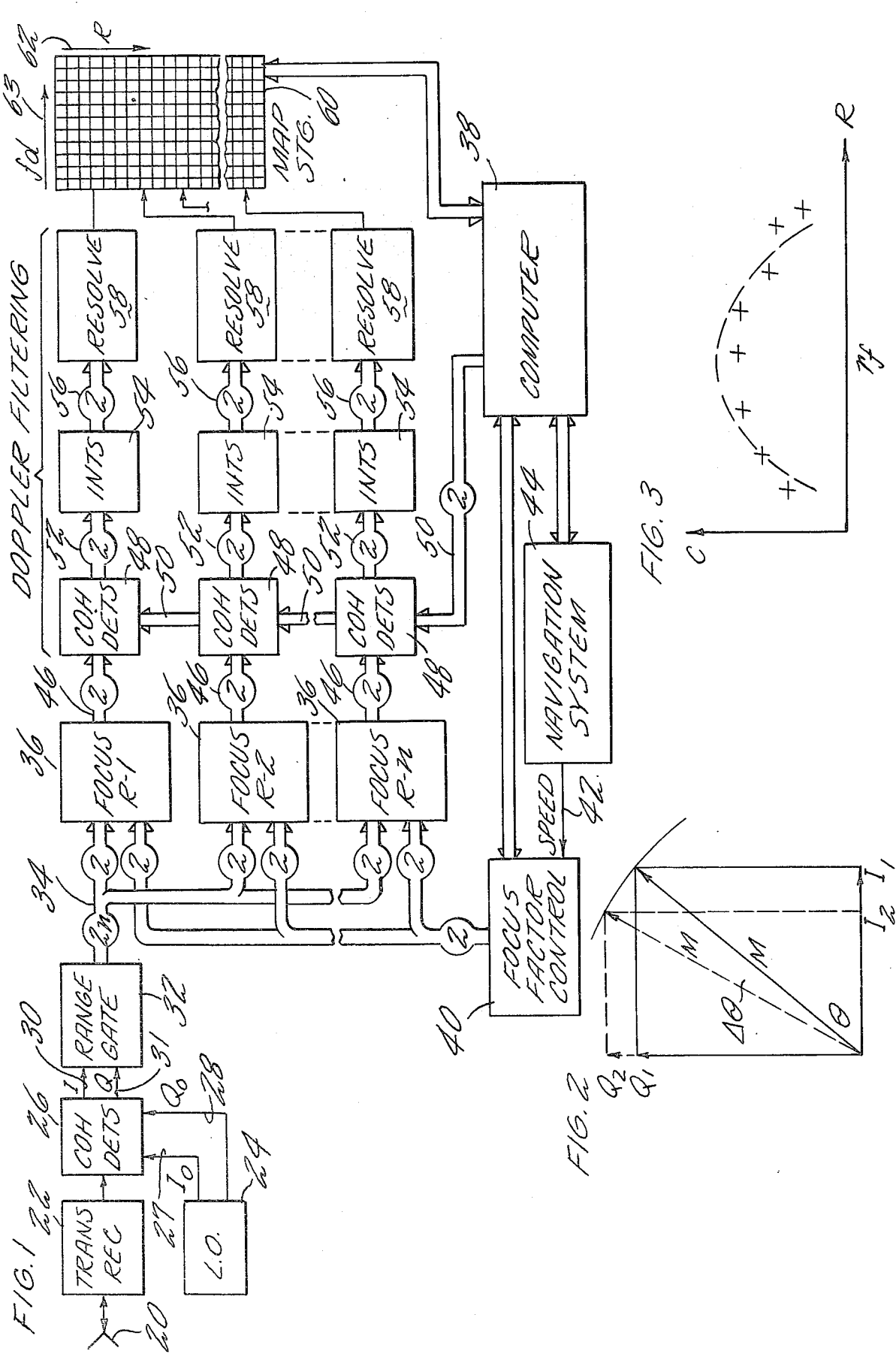

RADAR SPEED MEASUREMENT FROM RANGE DETERMINED BY FOCUS

BACKGROUND OF THE INVENTION

1. Field of the Invention

This invention relates to coherent pulse doppler synthetic aperture radars, and more particularly to an improved radar aircraft speed determining system.

2. Description of the Prior Art

Coherent pulse doppler synthetic aperture radars of the radar ground mapping type are well known in the art. As is known, the principle object of one form of such a radar is to derive high resolution maps over a large area of terrain by means of processing of the coherent return receive from an illuminator (a radar transmitting antenna) the illuminated area of which is much greater than the desired map resolution. In such processing radars, the returns received by the radar antenna are separated in accordance with range, thereby providing a plurality of range strips which are at distinct radial distances from the illuminator, or radar. Such systems also separate signals in accordance with the doppler frequency of return signals received, which frequency is the difference between the frequency of the transmitted wave and the frequency of the received wave which results from compression or expansion of the wave as a result, in turn, of a closing or opening velocity of the antenna with respect to a given reflector. Naturally, a map is defined when each resolvable point of intensity is expressible by the analysis of signals having in the information content thereof, designations of range and a second coordinate such as relative angle with respect to the antenna.

In the case of forward-looking, or squint radar, the doppler frequency of a given target changes instant by instant as a result of the fact that the relative bearing of the target to the aircraft (the angle in azimuth) changes instant by instant as a result of the aircraft's velocity. Thus, the doppler frequency changes quite rapidly, and more rapidly for targets at short range than for targets at extremely long range, on a relative basis. In order to accurately filter the return signals so as to achieve high resolution in doppler, it is desirable to utilize a long sampling interval and a doppler filter having a long time constant. For finite targets close to the radar, the target moves from one resolvable doppler frequency to another very rapidly. In order to achieve a long sampling interval at a given doppler frequency, it is therefore necessary to alter the data to make it appear as if it is frozen on the surface of a given doppler frequency cone throughout the sampling interval. This is achieved by what is referred to as focusing, including a parabolic focus term which continuously adds a phase angle to a given return signal so as to make it appear to be relatively static with respect to the aircraft (as might a distant start) throughout the processing interval. As the aircraft goes faster, more doppler focusing is required; as the aircraft goes slower, less focusing is required. The focusing applied to the return signals must therefore be governed as a function of aircraft speed.

In addition to focusing, resolution of the map (which is given in terms of doppler cone angle and range) into an orthogonal coordinate system, such as referred to North and East on the earth's surface, requires a very accurate measure of speed; for instance, in certan applications today, the degree of accuracy in map making may require a measurement of speed accurate to one part in several thousand. This speed measurement must be available during the time that the data is acquired for the map in order to resolve the map as a function of the velocity vector of the aircraft as the data is being collected through the radar system. In other words, this is not a factor which can be corrected later or which may be corrected in ground-based computer systems. It is also obvious that, if mapping information is to be utilized for navigational or weapon delivery purposes, the map must be accurately made on a real time basis while the aircraft is in flight, and therefore accurate speed determination must similarly be made in a real time basis during the mapping procedure. Prior art systems utilize the speed indications provided by the navigational system of the aircraft. However, since the speed can be determined only to a degree of accuracy which is less than the accuracy that may be required for a high resolution map, the focusing of return signals and orthogonal coordination may be sufficiently inaccurate so as to create intolerable errors in map generation.

Similarly, more focus correction is needed for targets which are close since the doppler frequency cone angle changes very rapidly, whereas very distant targets require less increase in focus or less correction. Therefore, focus is applied differently to each range gate.

As is derived in a copending application of the same assignee entitled ACCURATE SPEED AND CONE ANGLE MEASUREMENT IN A COHERENT PULSE DOPPLER SYNTHETIC APERTURE RADAR SYSTEM, Ser. No. 87,011, filed on Nov. 4, 1970 by Donald Richman, the relationship between speed (S), range (R), range rate ($\dot{R}$) and range acceleration ($\ddot{R}$) is $$S^2 = R\ddot{R} + \dot{R}^2 \qquad (1)$$

The R term relates to doppler cone angle, by $$\dot{R} = \lambda/2 f_d, \qquad (1a)$$

where $f_d$ = the doppler frequency and is quite accurately determined. The range (R) can be accurately determined from range gating. It is the range acceleration ($\ddot{R}$) which relates to focus, and which is only approximately accurate.

SUMMARY OF INVENTION

The object of the present invention is to provide an accurate measure of ground speed; an ancillary object of the invention is to accurately determine aircraft ground speed in a coherent pulse doppler synthetic aperture maping radar.

According to the present invention, doppler focus is applied to return signals in a coherent pulse doppler synthetic aperture radar without variation as a function of range, and signals relating to a resulting radar map are analyzed for maximum contrast, thereby to determine the range for which the focus is correct, from which accurate speed may be measured.

In accordance with the invention in one form, analysis of the resolution of various range slices of a coherent pulse doppler synthetic aperture radar map determines the range for which the greatest resolution has been achieved, and therefore the range for which focusing is correct; utilizing this range, the given focus which has been applied, and the measured value of range rate for that range and focus, speed is accurately calculated.

In accordance with a further aspect of the present invention, the resolution of several range slices of a coherent pulse doppler radar map may be determined and curve fitting utilized to find a range for which the focusing is accurate, from which accurate speed may be calculated.

The present invention provides an accurate speed calculation which is readily determined utilizing coherent pulse doppler synthetic aperture radar mapping apparatus known to the art, utilizing readily available processing techniques.

Other objects, features and advantages of the present invention will become more apparent in the light of the following detailed description of preferred embodiments thereof, as illustrated in the accompanying drawing.

BRIEF DESCRIPTION OF THE DRAWING

FIG. 1 is a simplified schematic block diagram of a coherent pulse doppler radar mapping system in which the present invention may be practiced;

FIG. 2 is a vector diagram illustrating the relationship between inphase and quadrature components of the radar video; and FIG. 3 is an illustration of contrast plotted for various ranges.

DESCRIPTION OF THE PREFERRED EMBODIMENT

Referring now to FIG. 1, a typical forward-looking coherent pulse doppler synthetic aperture radar system of the type in which the present invention may be practiced includes the usual antenna means 20 which transmits pulses of electromagnetic radiation and receives return pulses from an area illuminated by the transmitted pulses. The antenna is connected to transmitting and receiving apparatus 22, which are of any suitable type well known in the art and thus not described further herein. The frequency of transmission is controlled by a local oscillator 24, which in turn provides coherent detection signals to coherent detection circuits 26. In the present embodiment, it is assumed that both inphase coherent signals ($I_o$) and quadrature (90° out of phase) coherent signals ($Q_o$) are provided over a pair of lines 27, 28 to the coherent detectors 26, which detect both the inphase and quadrature portions of the video fed thereto by the receiver portion of the transmitting and receiving apparatus 22. The coherent detectors 26 may comprise synchronous modulators or any other well known form of detector so as to provide, at the output thereof, signals indicative of the magnitude of the inphase and quadrature components of the return wave on a pair of lines 30, 31. In practice, the signals may be analog voltage levels, the absolute magnitude of which is an indication of the magnitude of the reflectivity of the target point represented thereby, and the relative magnitudes of which are an indication of the phase angle of the reflected return signal. Of course, as is known in the art, the inphase and quadrature signals on the lines 30, 31 may preferably be digitized, thereby being of the form of a binary code (or suitable other code) of discrete digital signals on a plurality of lines (30, 31) rather than discrete voltage signals on a single pair of lines (30, 31).

The inphase and quadrature video on the lines 30, 31 is supplied to a range gate circuit 32 which separates the video into different range slices as a function of the time at which the different return signals are received. The number of range gates utilized is a function of the range resolution and the depth of range of the area to be mapped. The range gate 32 separates the signals into n pairs of inphase and quadrature signals, where n is the number of range resolution strips in the radar used. The output of the range gate therefore appears on 2n separate lines arranged in pairs, each pair including inphase and quadrature signals, each pair fed to a focus circuit 36 for the related range slice. Within each of the focusing circuits, a phase angle is added to the video represented by the inphase and quadrature signals such as to compensate for the motion of the aircraft with respect to the target, thereby causing the signals to appear to be in the surface of the same doppler cone over a period of tim, even though the doppler would naturally change as a result of the motion of the aircraft with respect to the target. This is referred to as parabolic focusing and uses a second order quadratic phase correction which is parabolic in nature as a function of time, commencing with relatively higher phase correction angles, and achieving a low or no correction angle, and again increasing the phase correction angle as a function of time. This may be done digitally, in accordance with well known vector geometry, by providing at each successive interval of time only the sines and cosines of the phase correction angle which is desired as is explained with respect to FIG. 2. Let $I_1$ represent the inphase video signal at the input to the focus circuit 36; $Q_1$ represent the quadrature video signal at the input to the focus circuit 36; $\theta$ represent the angle (See FIG. 2) of the vector which is resolvable from $I_1$ and $Q_1$; $\Delta\theta$ represent the phase correction term to be applied at any given moment; and M represent the magnitude of the resolvable reflectivity vector in the video. The focused inphase and quadrature terms ($I_2$, $Q_2$, FIG. 2) may be determined as follows:

$$I_1 = M \sin \theta \tag{2}$$

$$Q_1 = M \cos \theta \tag{3}$$

$$I_2 = M \sin (\theta + \Delta\theta) \tag{4}$$

$$I_2 = M \sin \theta \cos \Delta\theta + M \cos \theta \sin \Delta\theta \tag{5}$$

substituting equations (2) and (3) into (5)

$$I_2 = I_1 \cos \Delta\theta + Q_1 \sin \Delta\theta \tag{6}$$

$$Q_2 = M \cos (\theta + \Delta\theta) \tag{7}$$

$$Q_2 = M \cos \theta \cos \Delta\theta - M \sin \theta \sin \Delta\theta \tag{8}$$

and substituting equations (2) and (3) into (8)

$$Q_2 = Q_1 \cos \Delta\theta - I_1 \sin \Delta\theta \tag{9}$$

Thus, with any given moment in time, focus is achieved by providing only the sine and the cosine of the desired correction angle ($\Delta\theta$) to each of the focus units 36, each of which comprises a dual multiplier and summing circuit so as to perform the functions of equations (5) and (9), thereby to provide corrected inphase and quadrature video ($I_2$, $Q_2$) at the output of the summing circuits 36. The sines and the cosines in turn are derived from storage in a computer 38, which chooses the focus terms in response to a focus factor control circuit 40 as a function of speed of the aircraft, as provided over signal lines 42 from the navigation system 44 of the aircraft. In a mapping radar of this type known to the art, when operating in a mapping mode, the focus for each range slice is different than for each other range slice. The focus for any of the range slices is also a function of speed, as described hereinbefore. However, in operation of such a system in accordance with the present invention, the focus is purposely made to be the same for each range slice, chosen for a nominal speed which can be assumed to be constant over the measurement time interval, so that the same sine and cosine factors are applied at any given moment in time to all of the focus circuits 36 corresponding with each of the range slices. In this fashion, focus is chosen as a function of nominal speed to be correct for one of the range slices and progressively worse for increasing differentials in range from the correct range slice. This will naturally result in only one range slice which is properly focused (for the exact speed) and thereby has a maximum contrast, which results from increased resolution and accuracy in the correctly focused range slice in contrast with the other range slices. The well known range-tracking function is eliminated herefrom for simplicity.

The output of the focusing circuits 36 are applied over related groups of signal lines 46 to circuitry which performs doppler filtering in the well known fashion. This circuitry may typically comprise coherent detectors 48 which may take the form of synchronous demodulators or other suitable circuitry, which have applied thereto by signal lines 50, sines and cosines of phase correction angles which increase linearly with time, for computations of the type described hereinbefore with respect to FIG. 2, which provide, however, a linear phase adjustment which is the equivalent of a constant frequency. The output of the coherent detectors 48 are fed by suitable related signal lines 52 to corresponding integrator circuits 54, there being one integrator for the inphase signals and one integrator for the quadrature signals for each of the range slices (one corresponding to each focus circuit 36). The only signals which will integrate are those which are in phase throughout the integration period, the rest cancelling each other on a random basis. Thus, the output of the integrators 54 comprise inphase and quadrature signals at the doppler frequency corresponding with the linearly increasing phase change applied to the coherent detectors 48 by the lines 50.

The output of the integrators 54 are fed by suitable lines 56 to respective resolver circuits 58 which simply take the square root of the sum of the squares of the inphase and quadrature signals applied thereto so as to determine the magnitude (M) of the reflectivity response at the given doppler frequency in that range slice. Thus, the output of each of the resolver circuits 58 comprises a signal manifesting the magnitude of the reflectivity of the return from a single range/doppler bin, and therefore a resolvable map point. The output of the resolvers 58 is applied to a corresponding range slice of a map storage device 60 which may comprise a portion of the storage of the computer 38, or may be a separate storage apparatus, as may be desired to suit any implementation of the present invention. The storage 60 is arranged as an orthogonal matrix of range in one direction and doppler frequency in the other direction, as indicated by the arrows 62, 63. As is known in the art, the computer 38 will control the particular bin within a given range slice at which the magnitude, M, of a given target return signal is to be stored as a function of increments of time across one entire synthetic aperture (one complete map processing interval). As an example, the computer 38 may apply on the lines 50 successive sine and cosine valued over a period of time representing a first doppler frequency for a time interval equivalent to, say, 100 transmitted pulses, each given pair of sine and cosine values (representing a given phase correction angle) being applied to one pulse, and an increase in the angle being applied to the next pulse, successively, throughout the integration period of the integrator 54. An integration period may typically comprise one one/thousandth of a mapping interval, which would therefore result in there being a thousand doppler frequencies, and therefore a thousand doppler frequency bins per range slice. Of course, these design parameters may vary in accordance with the known teachings in the radar mapping art.

It is important to note that the description thus far has been exactly the same as that for a mapping radar of the type known to the art with the single exception that each range cell is provided with the same focus, rather than having different focus terms for each range in accordance with the teachings of the art. This is to purposely provide map data (that is, magnitude of return signals stored as a function of doppler frequency and range in a storage device 60) which is relatively accurate for one range slice only, and increasingly less accurate for successive increments of range on either side thereof. Other known forms of signal processing may also be used, so long as range gating and doppler filtering are accompanied by a constant focus factor in all range gates or slices.

From the data stored in the map storage device 60, the process in accordance with the present invention is completed by determining the range which has maximum contrast between successive map elements, and thereafter computing speed in accordance with equation (1). In accordance with the invention, two different methods may be utilized to determine the range for which correct focus has been provided, each of which involes determining a constant factor, C, for each range slice of the stored map, as follows:

$$C = \sum_D | M_d - M_{d+1} |. \tag{10}$$

Thus, the contrast factor is a summation across an entire range slice of the absolute value of the difference between the magnitude of the each adjacent pair of map elements for the elements from $d=1$ to $d=D$.

In accordance with one embodiment of the invention, simple comparison of the values of C computed for each range slice will determine the maximum value of C which has been computed, and that range slice is taken to be the correct range slice for the focus factor applied by the control 40 to the different focus circuits 36.

In accordance with another, preferred aspect of the invention, the values of C computed for all of the range slices are determined, and well known computer techniques are utilized to fit a curve to the results of the computations (which may be as illustrated briefly in FIG. 3). Thus, even though noise and other processing errors may provide somewhat mutilated results (as indicated by the crosses in FIG. 3), by fitting a curve to the results, a value $r_f$ may be found which represents a range value best suited to the focus utilized. By means of curve fitting, the focussed range can be resolved much finer than the width of one range slice, thereby permitting greater precision of the speed measurement. This is illustrated in FIG. 3 by $r_f$, which is between range slices. The least squared error parabola curve fit has been found to yield good results. This value of range is then incorporated in equation (1) to determine speed, accurately. The range rate (Ṙ) is determined from the doppler frequency according to equation (1a). The range acceleration is determined from the focus actually utilized by the relation $$\ddot{R} = \phi_m \left( \frac{2\lambda}{\pi t^2} \right) \tag{11}$$

where $\phi_m$ is the maximum focus phase angle applied at the start of the integration period, $\lambda$ is the wavelength, and t is the time interval of the synthetic aperture.

Instead of a full map storage 60, the invention may be practiced serially, by just accumulating the difference in magnitude of each successive integration period, for some extent of time, after which the maximum contrast can be identified as described hereinbefore.

Summarizing, the present invention comprises a method utilizing known coherent pulse doppler forward squint radar mapping systems, operated exactly in accordance with teachings known in the art, with the exception of the fact that focusing is applied in common to all range slices, rather than a different focus being applied to diffferent range slices. From the resulting data, which data corresponds exactly with map points determined in prior art systems, a range related to the greatest contrast of return signals is determined. In one embodiment, this is taken to be a given range slice exhibiting maximum contrast. In another embodiment, an exact range (which may even fall between range slices) is determined by a least squared error parabola curve fit, utilizing processing techniques known to the art. Then, the range is determined in accordance with the present invention, and the range rate is determined from the doppler frequency (the slope of the linear phase rate applied in the doppler filtering section; or in other types of doppler filtering apparatus, the doppler frequency to which the filter relates). Then from this, speed is calculated in accordance with equation (1). By choosing a focus term for the nominal speed of the aircraft as determined by the navigational system and a range gate or slice near the center of the range depth, peaking of contrast within the range depth of the apparatus is ensured, although any arbitrary range within the focus depth may be used as the basis for determining focus term signals to be used in processing.

Thus, although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described typical embodiments of my invention, that which I claim as new and desire to secure by Letters Patent of the United States is:

1. In the method of determining speed in a forward-looking, coherent pulse doppler synthetic aperture signal processing mapping radar apparatus, the steps of:
    (a) providing a forward-looking, coherent pulse doppler synthetic aperture signal processing mapping radar apparatus having range gating means for sorting return signals in accordance with range from which said signals are reflected, and in which the return signals are applied to respective range channels, each of said range channels including parabolic focusing in response to focus term signals applied thereto, doppler filtering and storage, each of said channels thereby capable of providing a plurality of successive signals representative of the magnitude of the return signal at each of a plurality of different successive doppler frequencies, the successive signals for all of said range channels comprising a range/doppler matrix of magnitude of reflectivity;
    (b) providing focus term signals relating to a nominal speed and an arbitrary selected one of said range channels and processing signals in said apparatus therewith;
    (c) determining the values of contrast of signals for each range channels of said range/doppler matrix;
    (d) determining a range for which contrast will be maximum;
    (e) calculating speed as the square root of the sum of: the square of the range rate with the product of range acceleration times the range selected in step (d).

2. The method according to claim 1 wherein said step (d) comprises:
    fitting a curve of contrast as a function of range to the values determined in step (c);
    determining maxima of said curve; and
    determining the range corresponding with said maxima.

* * * * *